United States Patent
Ogihara

(10) Patent No.: US 7,403,456 B2
(45) Date of Patent: Jul. 22, 2008

(54) OPTICAL DISC RECORDING METHOD AND APPARATUS

(75) Inventor: Koichiro Ogihara, Tokyo (JP)

(73) Assignee: Sony Corporation, Tokyo (JP)

( * ) Notice: Subject to any disclaimer, the term of this patent is extended or adjusted under 35 U.S.C. 154(b) by 570 days.

(21) Appl. No.: 10/843,835

(22) Filed: May 11, 2004

(65) Prior Publication Data
US 2005/0002309 A1    Jan. 6, 2005

(30) Foreign Application Priority Data
May 13, 2003   (JP) ............... 2003-134945

(51) Int. Cl.
*G11B 7/00* (2006.01)

(52) U.S. Cl. .............. 369/47.19; 369/47.51; 369/53.34; 369/59.11

(58) Field of Classification Search .............. None
See application file for complete search history.

(56) References Cited

U.S. PATENT DOCUMENTS

| | | | | |
|---|---|---|---|---|
| 4,841,514 A | * | 6/1989 | Tsuboi et al. | ............... 369/100 |
| 5,463,610 A | * | 10/1995 | Nishikawa | ............... 369/121 |
| 7,035,184 B2 | * | 4/2006 | Takeda | ............... 369/47.39 |

FOREIGN PATENT DOCUMENTS

| | | |
|---|---|---|
| JP | 7-262565 | 10/1995 |
| JP | 2001-344762 | 12/2001 |
| JP | 2002-183967 | 6/2002 |

* cited by examiner

*Primary Examiner*—Wayne Young
*Assistant Examiner*—Lixi Chow
(74) *Attorney, Agent, or Firm*—Oblon, Spivak, McClelland, Maier & Neustadt, P.C.

(57) ABSTRACT

An optical disc recording method and apparatus is capable of overwriting a phase change optical disc at high speed. With a preceding erasing beam out of two laser beams, a modulation component in an RF signal recorded on an optical disc is erased to a state where no problem occurs (the reflectance difference is reduced) and the top level is decreased to 70 to 40% of a top level of an original RF signal. After that, with the subsequent recording beam, a space is recorded at a laser power at which top level is reset to the original state (before the erasing process), and a mark is recorded at a laser power which can sufficiently decrease the bottom level. Consequently, even when the recording speed is the quadruple speed (about 1.6 to 2 times of a specification) much higher than a specific recording speed (for example, 2 to 2.4x) of a phase change optical disc, overwriting can be performed with a recording characteristic which can satisfy a regenerating characteristic specification.

9 Claims, 9 Drawing Sheets

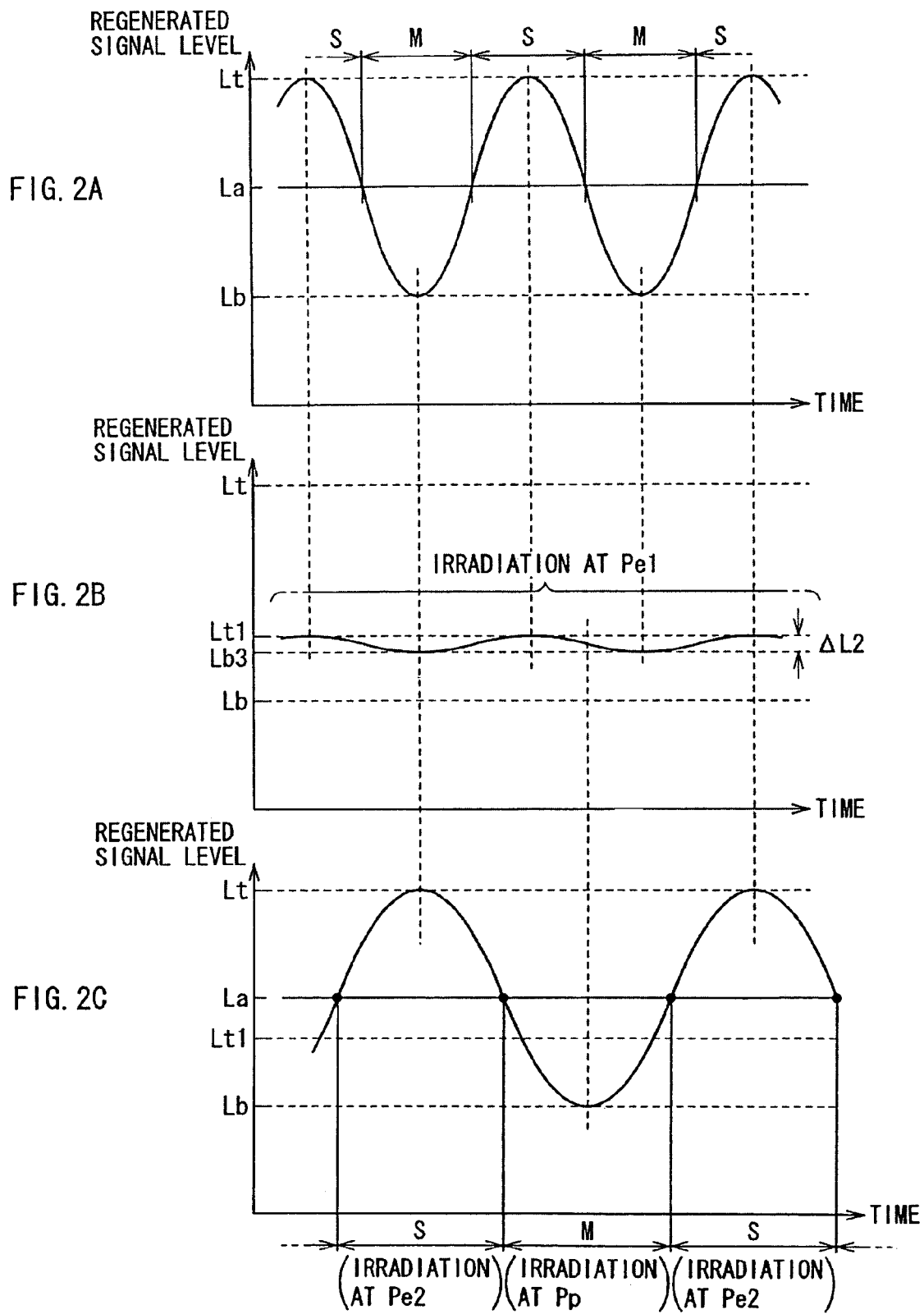

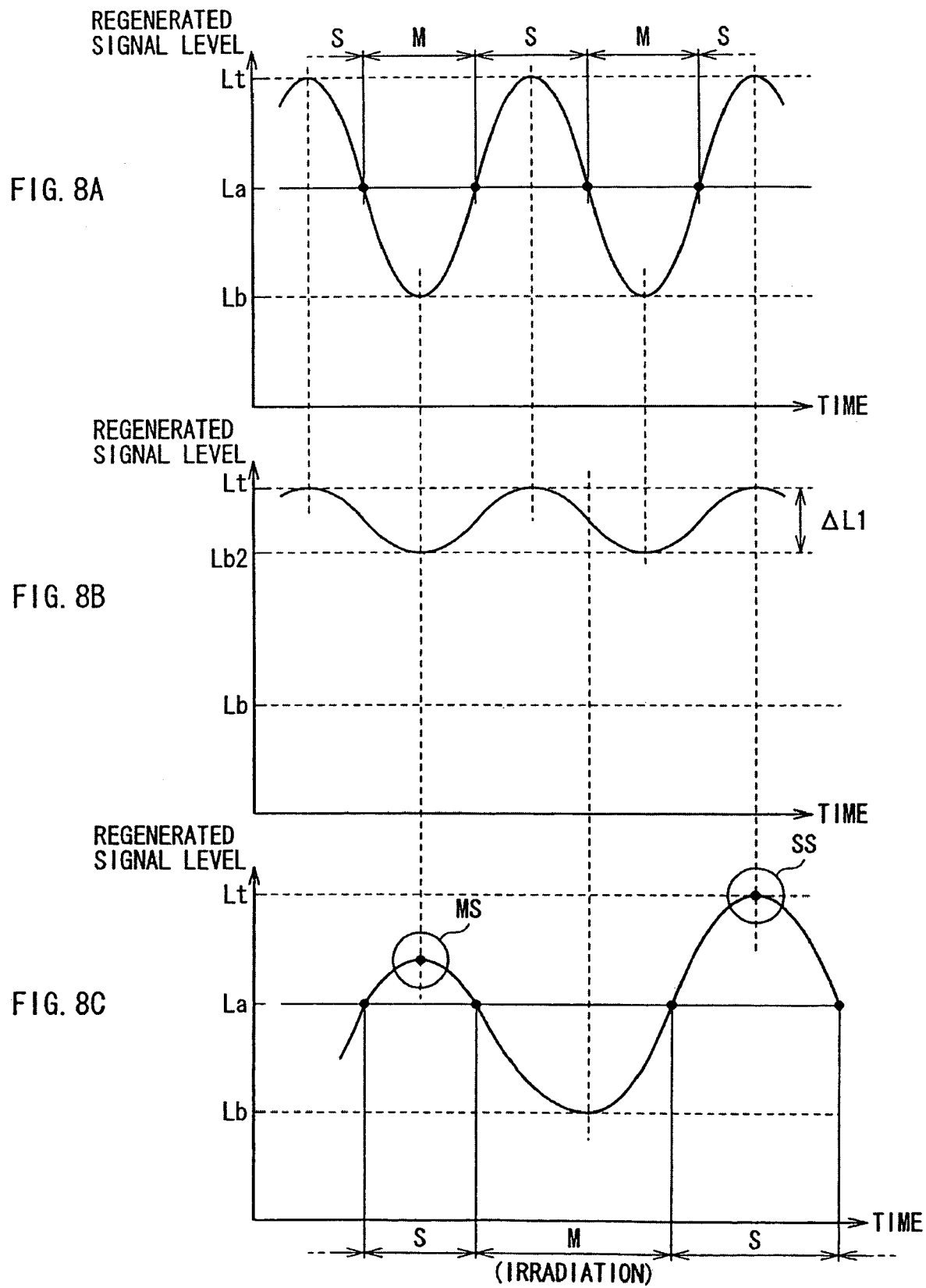

OPTICAL DISC RECORDING METHOD AND APPARATUS

BACKGROUND OF THE INVENTION

1. Field of the Invention

The present invention relates to a method and apparatus for recording a phase change optical disc and, more particularly, to a method and apparatus for recording an optical disc at high speed exceeding recording speed which is assumed (specified) for a phase change optical disc as an object.

2. Description of the Related Art

As rewritable optical discs, phase change optical discs employed by a DVD-RAM (Digital Versatile Disc-Random Access Memory), a DVD-RW (ReWritable), DVD+RW, CD-RW (Compact Disc-ReWritable), and the like are being widely spread. In the phase change optical disc, a signal recording layer made of a rare-metal-based phase change material which reversibly changes between a crystal state (crystal phase) and a non-crystal state (amorphous phase) by heat is formed. By irradiating the signal recording layer with a laser beam, a signal is recorded.

In the phase change optical disc, an irradiated portion is changed reversibly to the amorphous state or crystal state in accordance with parameters of a laser beam emitted to the signal recording layer, and recording and regenerating is performed according to a change in the reflectance. When the signal recording layer is quickly heated by irradiation of a laser beam of the highest power level and then quickly cooled, the signal recording layer enters an amorphous state of lower reflectance, and a portion called a "mark" is recorded. On the other hand, when the signal recording layer is gradually heated by irradiation of a laser beam of a lower power level and then gradually cooled, the signal recording layer enters a crystal state of higher reflectance irrespective of the state before the irradiation, and a portion called a "space" is recorded. A signal is regenerated by using a laser beam of a power level lower than that at the time of erasing a recording signal. In this case, a recording/regenerating apparatus detects return light of a laser beam reflected by the signal recording layer, and regenerates the recording signal by using the fact that the reflectance differs according to whether the signal recording layer in the position irradiated with the laser beam is in the crystal state or the amorphous state.

Different from a magnetooptic disc, a phase change optical disc does not need external magnetic field generating means for recording/regenerating, so that overwriting or rewriting of a recording signal can be easily performed. In addition, a small number of parts is sufficient for a driving device. Thus, the phase change optical disc can contribute to reduction in the size and cost of the recording/regenerating apparatus. Since a recordable information amount is larger as compared with that of a magnetooptic disc, it is expected that the phase change optical disc will be spread further.

Usually, recording using the phase change optical disc strongly depends on speed, so that recording cannot be performed in a wide speed range, and the recording speed is limited to a certain range. To be specific, recording speed peculiar to a phase change optical disc is specified in accordance with a kind. For example, in the case of a DVD, a double-speed disc is constructed so as to be adapted to recording at a linear velocity of 6.98 m/s (meters/second), and a 2.4× disc is constructed so as to be adapted to recording at a linear velocity of 8.376 m/s. 1× as a reference corresponds to 3.49 m/s.

In the phase change optical disc, as long as recording is performed at a recording speed specified as above, a signal can be properly recorded on not only a disc in an unused (unrecorded) state but also a disc on which a signal has been already recorded by properly changing the power of a laser beam. At a specific speed, recording after erasing of an existing signal is not performed but so-called direct overwrite (DOW) of directly overwriting a disc in accordance with a modulation signal can be also performed. Therefore, it is basically possible to perform the overwriting by modulating the power of a single laser beam. However, the phase change optical disc is limited with respect to time required for crystallizing a recording material. In the case where the linear velocity is increased, time required for crystallization is short and it is difficult to perform sufficient recording.

Conventionally, a method of performing overwriting by using a plurality of beams has been also proposed. In the method, at least two laser beams of different powers for erasing and recording are used and the overwriting is carried out by allowing an erasure spot to precede a recording spot on a track. The method has an advantage such that also in the case where the linear velocity is increased to be relatively high, it is easy to assure time required for crystallization.

The method of realizing the overwriting by using a plurality of beams is disclosed in, for example, Japanese Unexamined Patent Publication No. 2002-334473. According to the method, in the case of performing overwriting, a laser beam emitted from a semiconductor laser is split into a main beam for recording and a preceding beam for erasing by a first beam splitter. By using an external modulator, the power of the preceding beam for erasing is modulated so as to attenuate from the recording power to the erasing power. The preceding beam and the main beam are combined by a second beam splitter, and the erasure spot formed by the preceding beam precede the recording spot formed by the main beam on a track of an optical disc.

However, as already described above, dependency on speed of recording is large in the phase change optical disc, peculiar recording speed at which overwriting (direct overwriting) can be performed is determined in the specification, and it is difficult to perform recording at a speed much higher than the peculiar recording speed. For example, the recording method disclosed in Japanese Unexamined Patent Publication No. 2002-334473 will be examined. The disclosed invention is based on precondition that recording is performed in a speed range which is specified (permitted) in accordance with the kind of a phase change optical disc or at a speed slightly higher than the range. The case of performing overwriting at a speed (for example, 4×=13.96 m/s) much higher than the specified speed (for example, 2× or 2.4×) is not considered. The invention does not disclose the relation between the power level of the preceding beam for erasure and the power level of the main beam for recording and a method of setting the power levels in the case of performing the recording at a speed which is not the specified speed. Consequently, even the method is applied, it is considered to be difficult to perform recording at a speed much higher than the specified speed for the following reasons.

For example, in the case of setting the level of the erasure power in the preceding beam to the normal level adapted to specific recording speed, data cannot be erased well due to insufficient power, and it is feared that the residual component (residual modulation component) appears as a jitter. When the jitter is large, it appears as an error at the time of regenerating, so that performance deteriorates. As a result, it is difficult to perform overwriting at a high speed exceeding the specific speed. A jitter is fluctuation in the time direction of a regenerated RF (Radio Frequency) signal (hereinbelow, simply called a regenerated signal) and is generally defined as a value obtained by dividing a standard deviation of the difference between an edge obtained by binarizing a regenerated signal and the timing of a reference clock extracted from the regenerated RF signal by the cycle of a reference clock.

On the other hand, the level of the erasure power in the preceding beam may be set to be higher than that of a normal power (power used in the case of specific recording speed). In this case, however, the applicant of the present invention has learned the fact that, although the modulation component of a recorded signal (RF signal) decreases as the level of the erasing power is increased, when the erasing power is increased more than a certain extent, the top level (largest value or maximum value) of the RF signal decreases. It means that when the erasing power is increased to a certain extent or higher in overwriting, the level of a portion corresponding to a space region, of the RF signal decreases and, as a result, the difference from the level of a portion corresponding to a mark region is reduced. Specifically, the degree of modulation of an RF signal (on the disc) after overwriting degrades (decreases). In the case of regenerating the signal, the C/N (Carrier-to-Noise ratio) characteristic deteriorates.

As described above, in the conventional method, in the case of overwriting a phase change optical disc at a speed much higher than the specific speed, it is difficult to suppress a jitter while sufficiently assuring the degree of modulation of a regenerated signal. That is, it is difficult to realize overwriting at a high speed which is much higher than the specific speed.

SUMMARY OF THE INVENTION

The present invention has been achieved in consideration of the problems and its object is to provide an optical disc recording method and an optical disc recording apparatus capable of overwriting a phase change optical disc at high speed.

An optical disc recording method of the invention comprises: a first step of irradiating a region to be rewritten in a phase change optical disc with a light beam of first light intensity, thereby erasing a signal already recorded in the region to be rewritten at a second recording speed higher than the first recording speed; and a second step of selectively irradiating the region to be rewritten, the region having been irradiated with the light beam of the first light intensity, with a light beam of second light intensity lower than the first light intensity or a light beam of third light intensity higher than the first light intensity, thereby recording a signal in the region to be rewritten at the second recording speed.

An optical disc recording apparatus of the invention comprises: a light source for emitting the light beam; erasing control means for controlling the light source so that a light beam emitted to the region to be rewritten in a phase change optical disc comes to have first light intensity, thereby erasing a signal already recorded in the region to be rewritten at a second recording speed higher than the first recording speed; and recording control means for controlling the light source so that the light beam selectively emitted to the region to be rewritten, the region having been irradiated with a light beam of the first light intensity, has either second light intensity lower than the first light intensity or third light intensity higher than the first light intensity, thereby recording a signal into the region to be rewritten at the second recording speed.

In the optical disc recording method and apparatus, by irradiation with the light beam of the first light intensity, a signal already recorded is erased at the second recording speed. Subsequently, by selectively irradiating the region which has been irradiated with the light beam of the first light intensity with the light beam of the second light intensity or the light beam of the third light intensity, a signal is overwritten at the second recording speed.

In the first step or the erasing control means, preferably, by irradiation with the light beam of the first light intensity, the degree of modulation indicative of a relative difference between a top level and a bottom level of the recorded signal is changed from a first modulation degree before the irradiation to a second modulation degree lower than the first modulation degree, and the top level is changed from the original first level to a second level lower than the original first level. In the second step or the recording control means, preferably, the top level is reset from the second level to the first level by irradiation with a light beam of the second light intensity, and the bottom level is changed to a third level lower than the second level by irradiation with a light beam of third light intensity.

Terms used in the invention are defined as follows.

"Recording speed" denotes relative speed (concretely, linear velocity) between a phase change optical disc as a recording medium and an optical beam with which the phase change optical disc is irradiated. "First recording speed" denotes a lower speed which is, for example, a double speed (6.98 m/s) or 2.4× (8.376 m/s). "Second recording speed" denotes a higher speed which is, for example, a quadruple speed (13.96 m/s).

"Modulation degree" denotes a relative difference between the top level and the bottom level of a recorded signal, concretely, a value obtained by dividing the difference between the top level and the bottom level by the top level. "First modulation degree" denotes the degree of modulation corresponding to a state before a signal is erased in the first step. "Second modulation degree" denotes the degree of modulation corresponding to a state after a signal is erased in the first step.

"Top level" denotes the maximum value of a signal recorded or regenerated and "bottom level" indicates the minimum value of a signal recorded or regenerated.

"Erasure" denotes reduction of the original degree of modulation of a signal to a predetermined degree and does not always mean that the degree of modulation is reduced to zero. The predetermined degree is a degree at which a characteristic of a regenerated signal obtained by performing overwriting with a new signal and regenerating the signal satisfies a specification. "Recording" denotes formation of a "space" region of high reflectance and a "mark" region of low reflectance on a phase change optical disc.

"Light intensity" denotes intensity of a light beam to be emitted and is synonymous with power. "First light intensity" denotes light intensity at the time of erasing a recorded signal. "Second light intensity" denotes light intensity at the time of forming a space. "Third light intensity" denotes light intensity at the time of forming a mark.

"First level" corresponds to a space of high reflectance and is realized by irradiation with a light beam of the second light intensity. "Third level" corresponds to a mark of low reflectance and is realized by irradiation with a light beam of the third light intensity. "Second level" corresponds to an intermediate level (intermediate reflectance) between the first level (high reflectance) and the third level (low reflectance) and is realized by irradiation with a light beam of the first light intensity.

"Preceding light beam" denotes a light beam emitted to a phase change optical disc first, and "subsequent optical beam" denotes a light beam emitted to the phase change optical disc subsequent to the preceding light beam.

Other and further objects, features and advantages of the invention will appear more fully from the following description.

BRIEF DESCRIPTION OF THE DRAWINGS

FIGS. 2A to 2C are diagrams showing a change in a regenerated signal when overwriting is performed by the optical disc recording apparatus of FIGS. 1A and 1B.

FIGS. 8A to 8C are diagrams for explaining a first case in a second comparative example.

DETAILED DESCRIPTION OF THE PRFERRED EMBODIMENTS

Embodiments of the invention will now be described in detail hereinbelow with reference to the drawings.

Figures 1A, 1B:
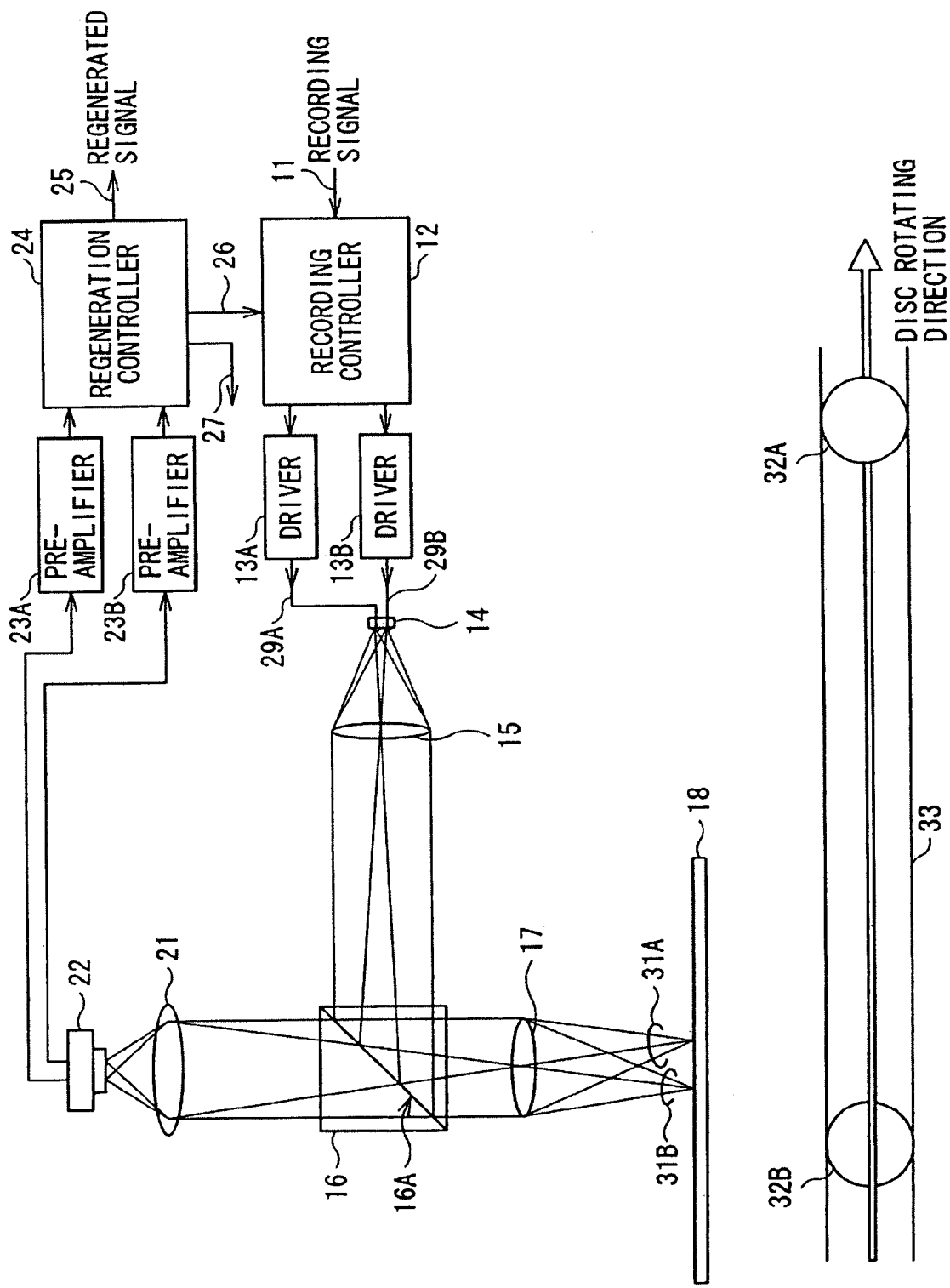
FIG. 1A is a diagram showing a schematic configuration of an optical disc recording apparatus according to an embodiment of the invention and FIG. 1B shows the positional relation of two light beam spots used by the optical disc recording apparatus.

FIGS. 1A and 1B show the configuration of an optical disc recording apparatus according to an embodiment of the invention. An optical disc recording method of an embodiment of the invention is embodied by the optical disc recording apparatus of the embodiment so that it will be also described concurrently. FIG. 1A shows the layout and connection relations of main optical elements and functional blocks of the optical disc recording apparatus, and FIG. 1B shows a positional relation of two laser beam spots formed on an optical disc.

The optical disc recording apparatus includes a recording controller 12 to which a recording signal 11 to be written as an RF signal is input, two drivers 13A and 13B disposed on the output side of the recording controller 12, and a 2-beam laser 14 in which light emission control is performed by drive signals output from the drivers 13A and 13B. The recording controller 12 corresponds to a concrete example of "erasing control means" and "recording control means" in the invention.

The recording controller 12 performs a modulating process or the like on a timing and a laser power (drive power of the 2-beam laser 14) at the time of recording or regenerating on the drivers 13A and 13B on the basis of the recording signal 11 and a regenerating instruction signal 26 from a regeneration controller 24 which will be described later. The drivers 13A and 13B control the driving of the 2-beam laser 14 on the basis of the control signal from the recording controller 12.

The 2-beam laser 14 has two light emitting parts (not shown) which are positioned so as to be slightly apart from each other and emits laser beams of certain light intensities in accordance with laser drive currents 29A and 29B from the drivers 13A and 13B from the light emitting parts. The laser beam emitted from the 2-beam laser 14 by the driving of the driver 13A functions as a recording beam 31A, and the laser beam emitted from the 2-beam laser 14 by the driving of the driver 13B functions as an erasing beam 31B. The recording beam 31A and the erasing beam 31B will be described later.

The optical disc recording apparatus also includes a collimator lens 15 for converting the laser beams emitted from the 2-beam laser 14 to parallel beam, a polarization beam splitter (PBS) 16 for reflecting the parallel beam emitted from the collimator lens 15 in an orthogonal direction, and an objective lens 17 provided between the PBS 16 and a phase change optical disc (hereinbelow, simply called optical disc) 18 and condensing the recording beam 31A and the erasing beam 31B emitted from the PBS 16 onto the optical disc 18. The optical disc recording apparatus further includes a condenser lens 21 provided on the side opposite to the objective lens 17 of the PBS 16, a photoreceptor 22 disposed almost in a focus position of the condenser lens 21, preamplifiers 23A and 23B for amplifying a signal from the photoreceptor 22, and the regeneration controller 24 to which the signal amplified by the preamplifiers 23A and 23B is input.

The PBS 16 has a polarization separation surface 16A which reflects S-polarized light and transmits P-polarized light of each of the incident recording and erasing beams 31A and 31B. Although polarizers are disposed in front and rear sides of the PBS 16, they are not shown. The condenser lens 21 is to condense the recording beam 31A and the erasing beam 31B which are reflected by the optical disc 18 and transmit the PBS 16 onto the photoreceptor 22.

The photoreceptor 22 is made by, for example, a photodiode or the like and outputs a signal according to the intensity and shape of the spot formed by each of the recording beam 31A and the erasing beam 31B condensed by the condenser lens 21. The signal corresponding to the light spot formed by the recording beam 31A is amplified by the preamplifier 23A and supplied to the regeneration controller 24. A signal corresponding to the light spot formed by the erasing beam 31B is amplified by the preamplifier 23B and supplied to the regeneration controller 24.

The regeneration controller 24 generates the regenerated signal 25 on the basis of the signals from the preamplifiers 23A and 23B and outputs the regenerated signal 25 to the outside and also generates a servo signal 27 such as a focus servo signal or a tracking servo signal and supplies the generated signal to an unshown focus servo mechanism or tracking servo mechanism. When a regenerating instruction is given from the outside, the regeneration controller 24 outputs the regenerating instruction signal 26 to the recording controller 12. On the optical paths of the recording beam 31A and the erasing beam 31B, in addition to the above components, a diffraction grating, an optical element for shaping a beam, and the like are disposed. Although the focus servo mechanism, tracking servo mechanism and the like are provided for the objective lens 17, they are not shown.

As shown in FIG. 1B, the recording beam 31A and the erasing beam 31B are condensed on the same track in the optical disc 18 at a certain interval (for example, about 10 μm) and form a recording beam spot 32A and an erasing beam spot 32B, respectively. The erasing beam spot 32B is positioned so as to precede the recording beam spot 32A in the disc rotating direction.

The operation of the optical disc recording apparatus with such a configuration will now be described.

In the optical disc recording apparatus, signal is recorded as follows. First, the recording controller 12 executes a timing control, a laser power control, and the like for recording on the drivers 13A and 13B on the basis of the input recording signal 11. The details of the controls will be described later. The 2-beam laser 14 emits the recording beam 31A and the erasing beam 31B of the powers according to the drive currents from the drivers 13A and 13B. The recording beam 31A and the erasing beam 31B are condensed on the same track 33 in the optical disc 18 by the objective lens 17 via the collimator lens 15 and the PBS 16, thereby forming the recording beam spot 32A and the erasing beam spot 32B, respectively.

The erasing beam spot 32B precedes the recording beam spot 32A in the disc rotating direction and performs a preliminary erasing (hereinbelow, which will be simply called erasing) process on an RF signal already recorded on the optical disc 18. The erasing process is performed by setting the power of the erasing beam 31B to the first light intensity. The recording beam spot 32A overwrites the recording signal 11 in the region subjected to the erasing process with the erasing beam spot 32B. The overwriting is performed by setting the power of the recording beam 31A to the second light intensity lower than the first light intensity or the third light intensity higher than the first light intensity and selectively irradiating a preliminary erase region with the recording beam 31A. When the power of the recording beam 31A is set to the second light intensity, a mark is formed. When the power of the recording beam 31A is set to the third light intensity, a space is formed.

At this time, the recording controller 12 performs the timing control as follows. In starting phase of recording, after the erasing operation with the preceding erasing beam 31B is started, the recording controller 12 controls a timing so as to wait only by time required for the optical disc to cross the beam interval on the optical disc and to start the recording operation using the recording beam 31A. On the other hand, in ending phase of recording, after the erasing operation with the preceding erasing beam 31B is finished, the recording controller 12 controls a timing so as to wait only by time required for the optical disc to cross the beam interval on the optical disc and to finish the recording operation using the recording beam 31A.

During recording of signals, the photoreceptor 22 outputs signals according to the incident positions and intensities of the incident recording and erasing beams 31A and 31B reflected by the optical disc 18. The signals are input to the regeneration controller 24 via the preamplifiers 23A and 23B and supplied as the servo signals 27 such as the focus servo signal, tracking servo signal, and the like to the recording controller 12. The servo signal 27 is provided for servo controls executed by a focus servo mechanism and a tracking servo control mechanism which are not shown.

On the other hand, signal is regenerated as follows. When the regenerating instruction signal 26 is input from the regeneration controller 24, the recording controller 12 sets the recording beam 31A to the power for regeneration and performs timing control of light emission for regeneration on the driver 13A. The 2-beam laser 14 emits the recording beam 31A of the regenerated power according to the drive current from the driver 13A. The recording beam 31A is reflected by the optical disc 18 by the objective lens 17 via the collimator lens 15 and the PBS 16 and reflection light is incident on the photoreceptor 22. The photoreceptor 22 outputs a signal according to the position and intensity of incident light and the signal is input to the regeneration controller 24 via the preamplifier 23A. The regeneration controller 24 generates the regenerated signal 25 and the servo signal 27 as RF signals on the basis of the input signals. The regenerated signal 25 is output to the outside and the servo signal 27 is provided for the focus servo control and the tracking servo control.

Some comparative examples of the embodiment will be described prior to explanation of the characteristic part in the optical disc recording method of the embodiment.

COMPARATIVE EXAMPLE 1

First, a normal recording method, that is, a recording method of overwriting in a specific range (range of the permissible recording speed) will be examined with reference to FIG. 5 and FIGS. 7A to 7C. It is assumed here that a DVD+RW disc of which specification of recording speed is 2.4×, a DVD-RW disc of double speed, or the like is used and the recording is performed within the specification range. In the case of a DVD, 1× denotes a linear velocity of 3.49 m/s.

Figure 5:
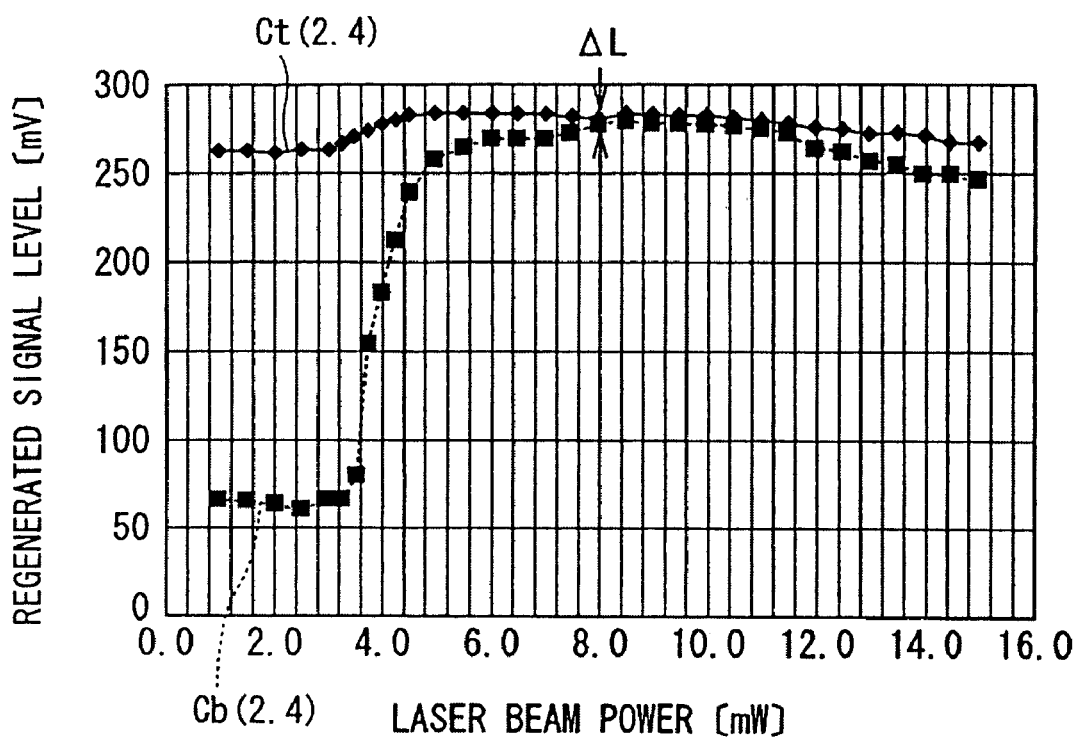
FIG. 5 is a diagram showing a laser power-regenerated signal level characteristic in the case of erasing a signal recorded on a phase change optical disc at a speed within a specific range.

FIG. 5 shows the relation between the laser power and the regenerated signal level after erasure (that is, a disc residual signal level) in the case where an erasing operation is performed on a recorded optical disc at a speed within the specification range. In FIG. 5, the horizontal axis indicates the laser power (unit: mW) and the vertical axis indicates the disc residual signal level (unit: mV). In the diagram, a solid line Ct(2.4) shows a change in the top level in the regenerated signal, and a broken line Cb(2.4) shows a change in the bottom level.

Figure 7A:
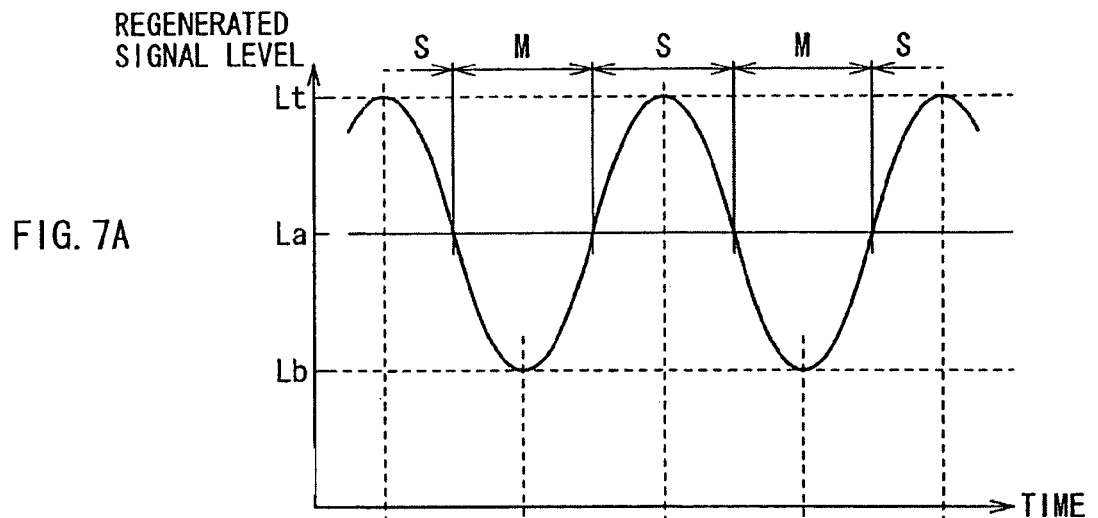
FIGS. 7A to 7C are diagrams illustrating a first comparative example.
Figure 7B:
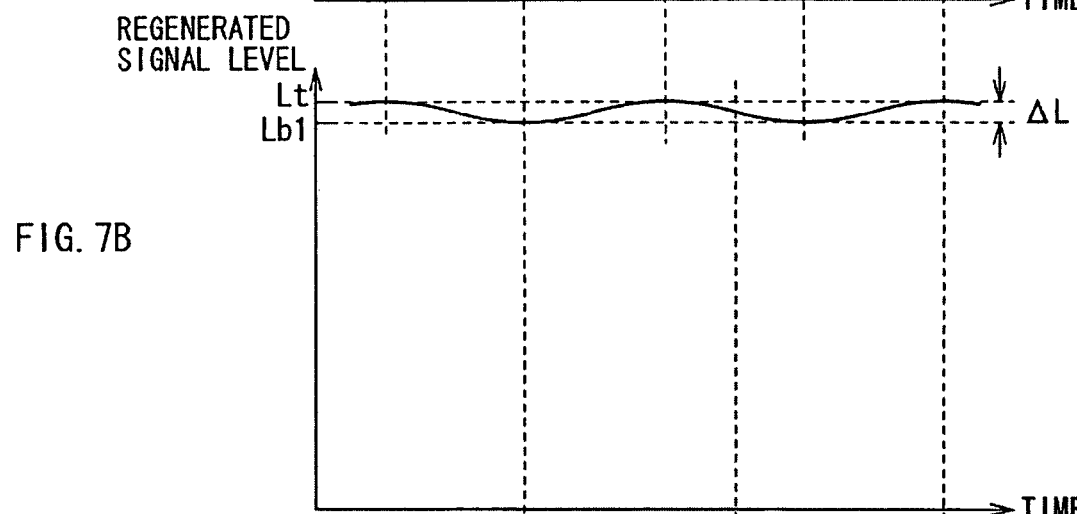
Figure 7C:
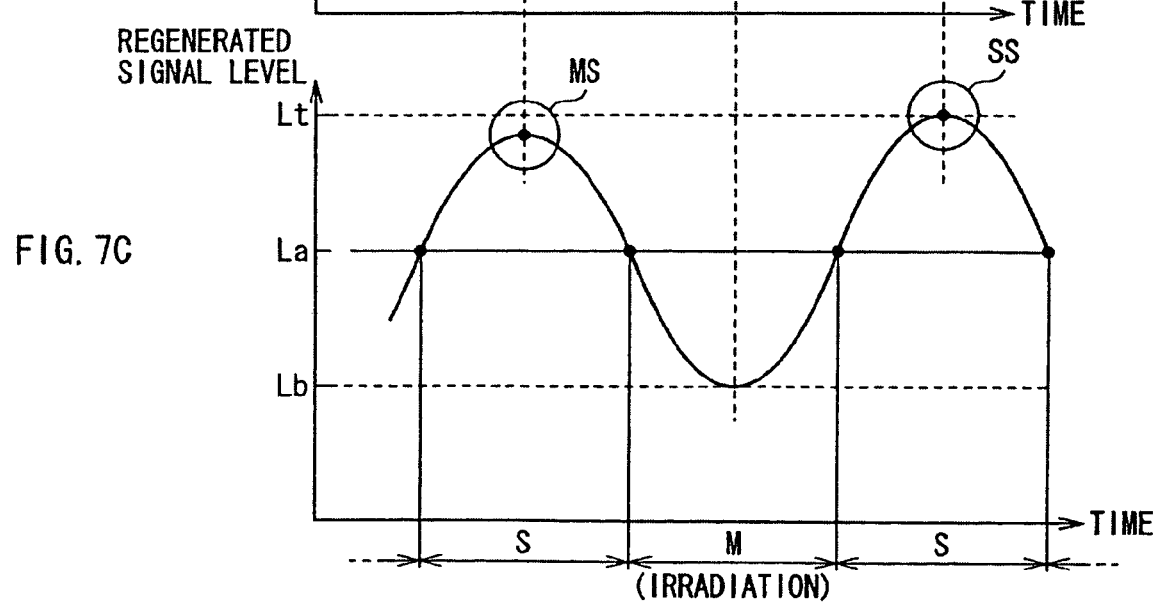

FIGS. 7A to 7C show an example of the regenerated signal waveform. FIG. 7A shows a regenerated signal waveform after recording at a speed in the specification range. FIG. 7B shows a regenerated signal waveform (disc residual signal waveform) after erasing at a speed within the specification range. FIG. 7C shows a regenerated signal after recording at a speed within the specification range on an erased optical disc as shown in FIG. 7B. In FIGS. 7A to 7C, the horizontal axis indicates time, and the vertical axis indicates the regenerated signal level (unit: mV).

Usually, in a recorded optical disc, a marked portion is in an amorphous state, so that the reflectance is low. A space portion is in a crystal state, so that the reflectance is high. When the DC level (corresponding to reflectance) of a long mark portion of about 8T to 14T and that of a space portion are compared with each other, since the normal degree of modulation is 60 to 70%, the level of the mark portion is about 30 to 40% of that of the space portion. 1T denotes a reference length of a mark and is, for example, about 0.13 μm.

Therefore, for example, when an RF regenerated signal having a waveform as shown in FIG. 7A is considered, the ratio Lb/Lt of the bottom level Lb to the top level Lt is about 30 to 40%. An average value level La [=(Lt+Lb)/2] is about 65 to 70% of the top level Lt. For example, when it is assumed that the average value level La is a threshold value used when data is binarized, a region S higher than the average value level La corresponds to the space portion, and a region M lower than the average value level La corresponds to the mark portion.

A case of performing the erasing operation on the optical disc on which an RF signal is recorded at a normal speed will be examined. When the laser power is, for example, driven with direct current and increased at a speed corresponding to 1× to 2.4×, the whole recording layer changes to a crystal state and the reflectance increases. As a result, recorded data is erased (to be accurate, the modulation component decreases). As the laser power increases, the modulation component of the regenerated signal decreases in such a manner that the bottom level Lb (corresponding to the long mark portion of 8 to 14T or the like which is in the amorphous state) approaches the top level Lt (corresponding to the space portion in the crystal state) which stays almost constantly and reaches to a level at which overwriting to be performed after that is not hindered.

FIG. 5 shows an example of the case where the erasing operation is performed at the 2.4 speed. In the example, it is understood that when a laser beam of the power higher than 3.5 mW is emitted, the bottom level of the RF signal increases, the ratio $\Delta L/(Lt-Lb)$ of the residual component $\Delta L$ to the level between the peaks (the difference between the top level Lt and the bottom level Lb) of original RF signals becomes about 6% (−24 dB) at 6 mW and becomes about 3% (−30 dB) at 8 mW. The residual component $\Delta L$ corresponds to a residual component after an original mark portion is overwritten with a space in actual recording (direct overwriting). Although the bottom level approaches the top level Lt, the bottom level does not coincide with the top level perfectly but remains to be a value Lb1 slightly lower than the top level Lt, so that a long mark of 14T or the like does not disappear but remains till the end. Therefore, if a signal is regenerated after the erasing operation, the regenerated signal waveform includes, although a little, the residual component $\Delta L$ (=Lt−Lb1) as shown in FIG. 7B.

When the optical disc subjected to the erasing operation is overwritten with an RF signal as described above, a regenerated signal after the overwriting is as shown in FIG. 7C. The overwriting is performed by irradiating an optical disc with a laser beam of a high power by which a mark can be formed (by which the recording layer in the disc can be made amorphous). FIG. 7C shows a case where overwriting is performed with an RF signal having a pattern different from the pattern of the original signal.

In this case, irrespective of the original state of the irradiated portion (whether the irradiated part was a space part or a mark part), the recording level (reflectance) of the portion irradiated with the laser beam uniformly changes to the original bottom level Lb. On the other hand, the portion which is not irradiated with a laser beam becomes a new space portion. Due to this, the recording level (reflectance) of the new space portion slightly differs depending on the original state. Concretely, in the case where the portion which is originally a space portion newly becomes a space portion (indicated by reference characters SS), the recording level (reflectance) of the portion becomes almost equal to the original top level Lt. On the other hand, in the case where a portion which is originally a mark portion is rewritten to a space portion (indicated by reference characters MS), the recording level (reflectance) of the portion becomes lower than the original top level Lt only by the amount of the residual component $\Delta L$. However, even if there is the residual component $\Delta L$ of such an extent, the peak height of a recorded signal waveform varies slightly, and the signal waveform is not so deformed as compared with a signal waveform obtained in the case where the same RF signal is recorded on an unrecorded optical disc. Consequently, for example, the position of the threshold value used for discrimination between the space S and the mark M crosses the regenerated signal waveform (that is, the boundary position between the space S and the mark M) does not fluctuate so much in the time base direction. A jitter of the regenerated signal is not disturbing in practice. As a result, overwriting can be performed without a problem as long as the recording speed is within a specified recording speed range.

COMPARATIVE EXAMPLE 2

With reference to FIGS. 6, 8A to 8C, and 9A to 9C, the case of performing recording at the quadruple speed which largely exceeds a specification range by using a DVD+RW disc of which recording speed specification is 2.4×, a DVD-RW disc of double speed, or the like will be examined. In the case of a DVD, the quadruple speed corresponds to linear velocity of 13.96 m/S. In a DVD+RW disc, it corresponds to 1.6 times as high as the specific speed. In a DVD-RW disc, it corresponds to twice as high as the specific speed.

Figure 6:
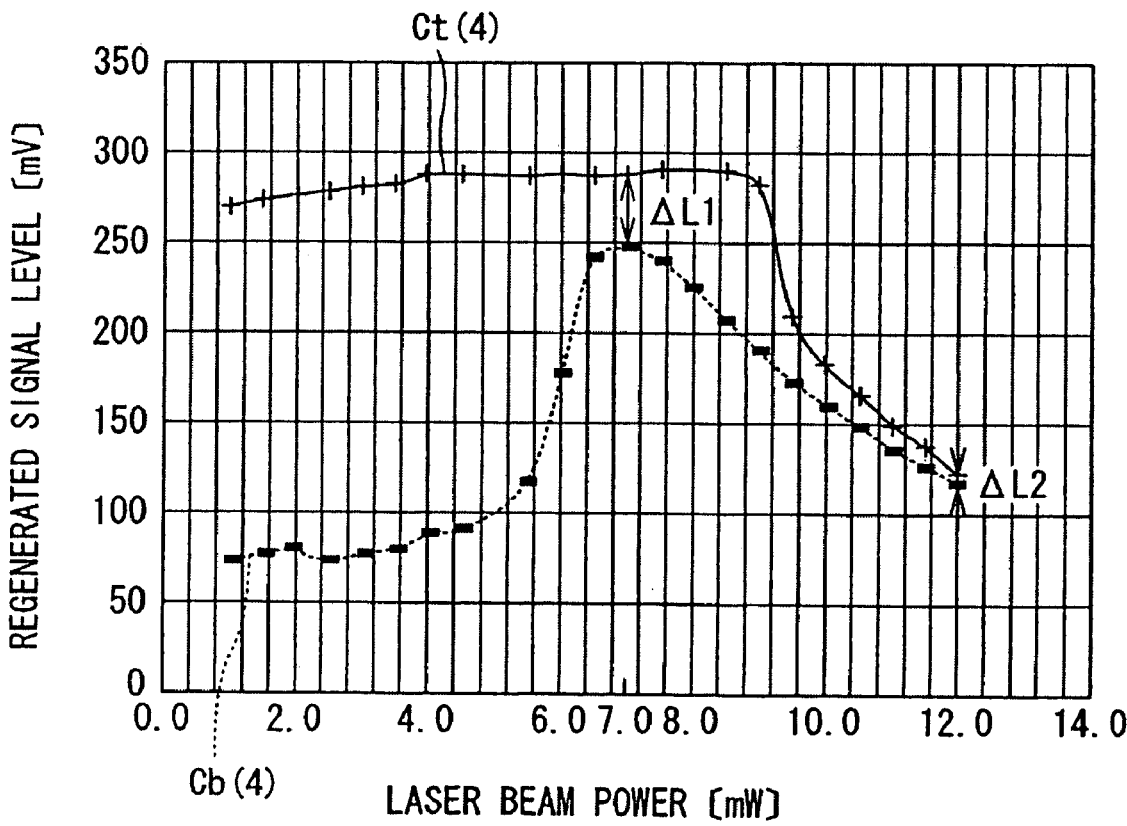
FIG. 6 is a diagram showing a laser power-regenerated signal level characteristic in the case of erasing a signal recorded on the phase change optical disc at a speed much higher than a specific speed.

FIG. 6 shows the relation between the laser power and the regenerated signal level (residual component after erasing) in the case where erasing operation is performed at the quadruple speed. In FIG. 6, the horizontal axis indicates a laser power (unit: mV) and the vertical axis expresses the regenerated signal level (unit: mV). In the diagram, the solid line Ct(4) expresses changes in the top level of a regenerated signal, and the broken line Cb(4) expresses changes in the bottom level.

Figure 9A:
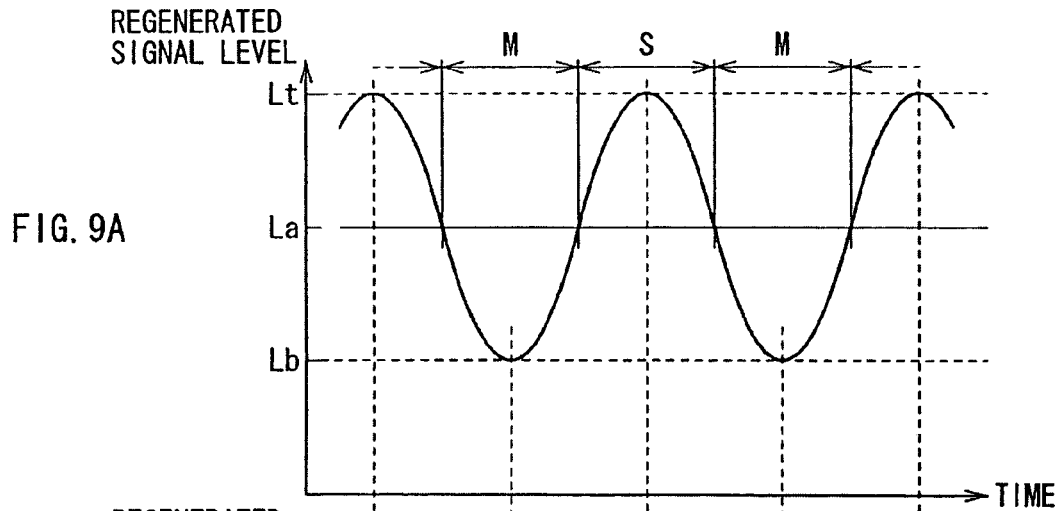
FIGS. 9A to 9C are diagrams for explaining a second case in the second comparative example.
Figure 9B:
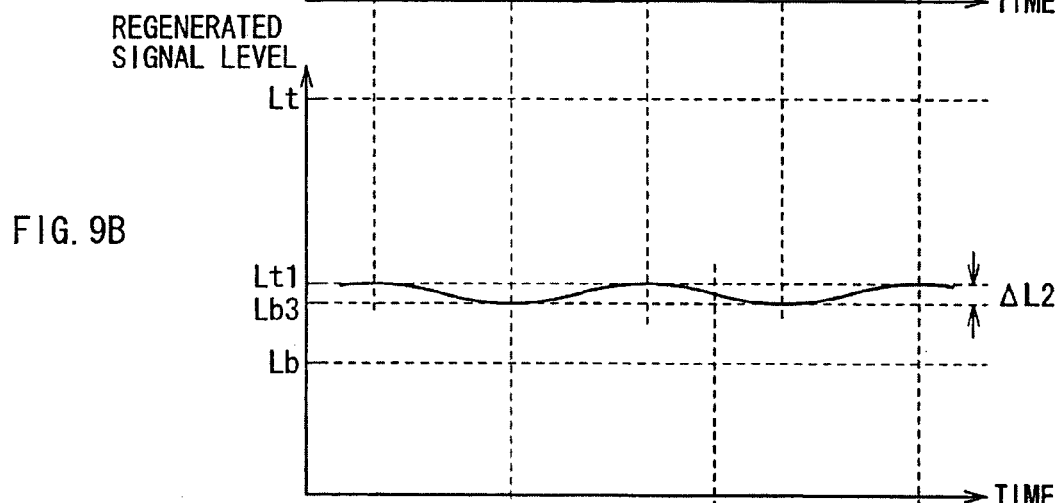
Figure 9C:
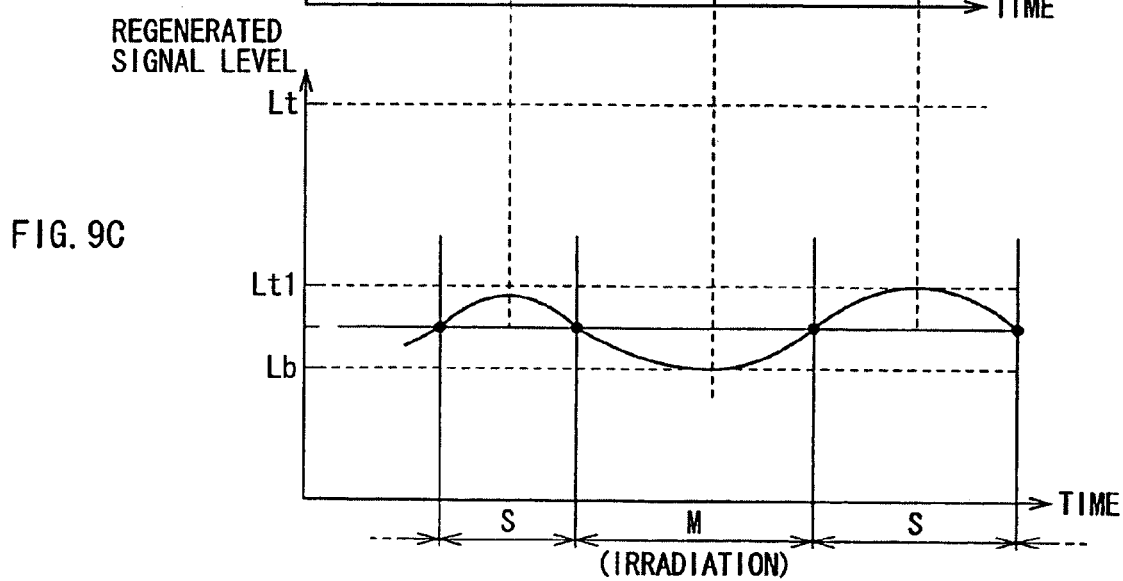

FIGS. 8A to 8C and FIGS. 9A to 9C show examples of the regenerated signal waveform obtained when overwriting is performed after the erasing process with laser beams of different powers. FIGS. 8A and 9A show regenerated signal waveforms (disc residual signal waveforms) obtained after recording is performed at normal speed (2× or 2.4×). FIGS. 8B and 9B show regenerated signal waveforms obtained after erasing is performed at the quadruple speed on an optical disc recorded with the signal waveforms shown in FIGS. 8A and 9A, respectively. FIGS. 8C and 9C show RF regenerated signals obtained after recording is performed at the quadruple speed on an optical disc in an erased state as shown in FIGS. 8B and 9B, respectively. In FIGS. 8A to 8C and FIGS. 9A to 9C, the horizontal axis denotes time, and the vertical axis indicates the regenerated signal level (unit: mV).

First, a case of performing the erasing process at the quadruple speed on an optical disc in which the regenerated signal waveforms are as shown in FIGS. 8A and 9A by recording at normal speed will be examined.

As shown in FIG. 6, when the laser power is increased by DC driving, at a low power, the disc changes to a crystal state as a whole and the reflectance increases. As a result, the bottom level of a recorded signal gradually rises and approaches to the top level, and a modulation component (residual component) of a signal decreases. At a power exceeding 7 mW, the bottom level starts descending. Further, when the power exceeds 9 mW, the top level also descends. As both of the bottom and top levels descend, the difference between the levels decreases and the modulation component becomes smaller. When the power becomes about 12 mW, the level becomes the residual component level $\Delta L$2 at which the overwriting operation is not disturbed. In this case, the top level is lowered by about 40 to 50% as compared with the case where the erasing operation is performed at 2.4×. The reason why the bottom and top levels descend as the erasing power increases is thought as follows. Since the linear speed is much higher than the specification, the state is close to quick heating and quick cooling rather than gradual heating and gradual cooling, so that the disc is entering an amorphous state.

Assuming now that the erasing power is set to about 7 mW and 12 mW, a state after erasing and a state after overwriting subsequent to the easing will be examined.

COMPARATIVE EXAMPLE 2-1

In the case where the erasing power is set to about 7 mW, as obvious from FIG. 6, the residual component ΔL1 is much larger than the residual component ΔL (FIG. 5) of the case where erasing operation is performed at normal speed. Therefore, when the signal is regenerated as it is after the erasing operation, the regenerated signal waveform changes from the original waveform (FIG. 8A) to the waveform including the large residual component ΔL1 (=Lt−Lb2) as shown in FIG. 8B.

When the optical disc subjected to the erasing operation is overwritten with the RF signal having a pattern similar to that of Comparative Example 1, the regenerated signal after the overwriting is, for example, as shown in FIG. 8C. The overwriting is performed by selectively irradiating the optical disc with a laser beam having a large power (for example, 16 mW or larger) by which a mark can be formed (the recording layer in the disc can be made amorphous).

In this case, the recording level (reflectance) of the portion irradiated with the laser beam uniformly changes to the original bottom level Lb irrespective of the original state of the irradiated portion. On the other hand, the portion which is not irradiated with a laser beam becomes a new space portion. Consequently, the recording level (reflectance) and the regenerated signal level of the new space portion slightly differ depending on the original state. Concretely, in the case where the portion which is originally a space portion becomes a new space portion (indicated by reference characters SS), the recording level (regenerated signal level) of the portion becomes almost equal to the original top level Lt. On the other hand, in the case where a portion which is originally a mark portion is rewritten to a space portion (indicated by reference characters MS), the recording level (regenerated signal level) of the portion becomes lower than the original top level Lt only by the amount of the residual component ΔL1. Since the residual component ΔL1 in this case is much larger than that in Comparative Example 1, the peak height of a recorded signal waveform varies largely, and the signal waveform is largely deformed as compared with a signal waveform obtained in the case where the same RF signal is recorded on an unrecorded optical disc and the signal waveform in Comparative Example 1. Consequently, for example, the position of the threshold value crosses the regenerated signal waveform (that is, the boundary position between the space S and the mark M) fluctuates greatly in the time base direction, and a jitter of the regenerated signal increases remarkably.

Figure 10:
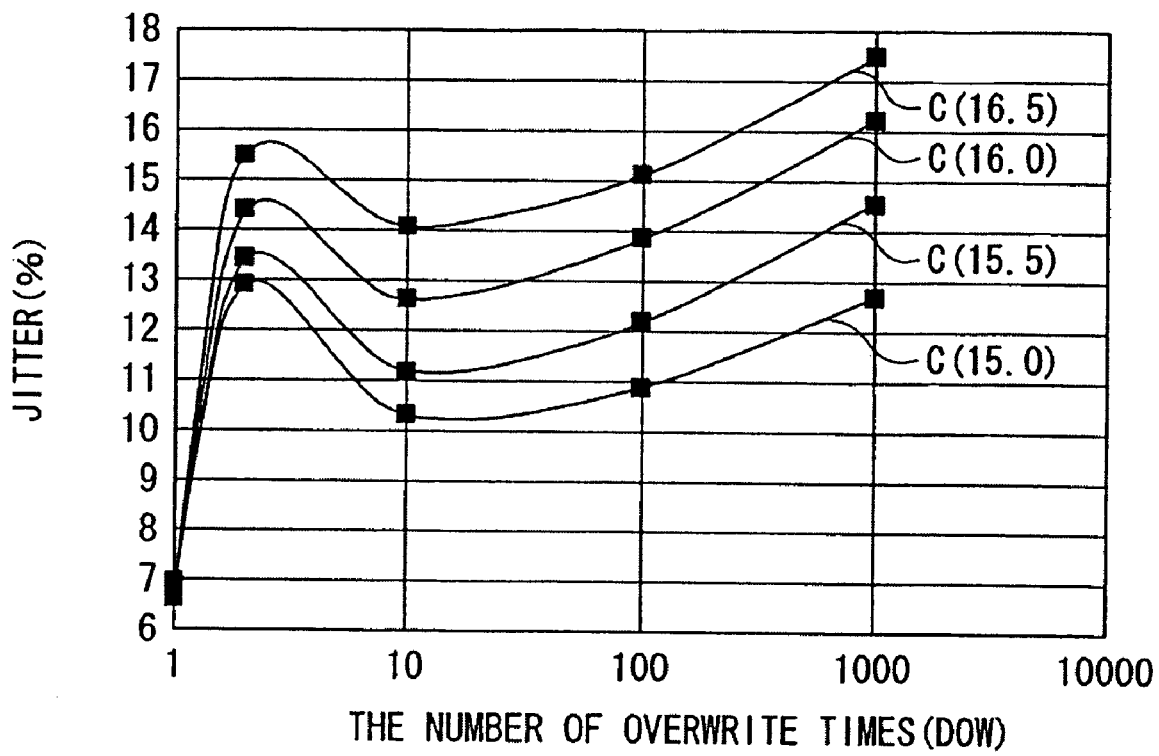
FIG. 10 is a diagram showing the number of overwrite times—jitter characteristic in the case of overwriting a 2.4× disc at the quadruple speed by a recording method of the second comparative example.

FIG. 10 shows the DOW characteristic obtained in the case where a 2.4× disc is overwritten at the quadruple speed. The DOW characteristic shows how a jitter of a regenerated signal changes in accordance with the number of overwrite times when overwriting is repeated at the same laser power. An example of the case where the peak power (power for recording a space) of a laser is changed in steps of 0.5 mW from 15 mW to 16.5 mW is shown here. Curves C (15.0), C (15.5), C (16.0), and C (16.5) show jitter characteristics in the case where the peak power is set to 15 mW, 15.5 mW, 16.0 mW, and 16.5 mW, respectively. The ratio between the peak power and the erase power is set to be constant.

In the example of the diagram, in recording of the first time (DOW=1, that is, the case where recording is performed on an unrecorded optical disc), the jitter is about 7% at any of the peak powers, and there is no problem. In recording of the second time (DOW=2), however, a jitter exceeds 13 to 15% and the optical disc cannot be used at this level. In practice, the upper limit of the jitter is 9 to 10%.

In the method of the comparative example, it is difficult to perform the overwriting at a speed much higher than the specific speed while suppressing the jitter in the regenerated signal to the practical level.

COMPARATIVE EXAMPLE 2-2

On the other hand, in the case where the erase power is set to about 12 mW, as obvious from FIG. 6, although the residual component ΔL2 becomes almost equal to the residual component ΔL (FIG. 4) in the case where erasing is performed at normal speed, the top level is remarkably low as compared with the case of performing erasing at normal speed.

As shown in FIG. 9A, when it is assumed that the top level Lt of the RF signal is 100 and the bottom level Lb is 30 in a recording state before erasure, the degree of modulation and amplitude of the RF signal before erasure are as follows.

Modulation degree=$(Lt-Lb)/Lt$=(100−30)/100=0.7

RF amplitude=$Lt-Lb$=100−30=70

When the erasing power is set to about 12 mW for an optical disc in such a state and the erasing process is performed at the quadruple speed, the regenerated signal waveform showing a recording state of an optical disc is, for example, as shown in FIG. 9B. As described above, the residual component ΔL2 decreases to an extend at which the overwriting is not disturbed but the top level largely decreases from the original top level Lt to Lt1.

When the optical disc subjected to the erasing process is overwritten with an RF signal having a pattern similar to that in Comparative Example 1, the regenerated signal is, for example, as shown in FIG. 9C. The overwriting is performed by selectively irradiating an optical disc with a laser beam of a large power by which a mark can be formed (the recording layer in the disc can be made amorphous).

In this case, the recording level (reflectance) of the portion irradiated with the laser beam uniformly changes to the original bottom level Lb irrespective of the original state of the irradiated portion. On the other hand, the portion which is not irradiated with a laser beam becomes a new space portion. Since the recording level (reflectance) of the new space portion has remarkably dropped due to the preceding erasing process, as shown in FIG. 9C, the difference between the top level Lt1 and the bottom level Lb becomes small. For example, when it is assumed that the top level changes from the original top level Lt (=100) to Lt1 (=50), since the bottom level Lb remains at 30, for example, the degree of modulation and amplitude of the RF signal after overwrite become as follows.

Modulation degree=$(Lt1-Lb)/Lt1$=(50−30)/50=0.4

RF amplitude=$Lt1-Lb$=50−30=20

The degree of modulation in this case does not satisfy 0.6 as a normal specification. The RF amplitude becomes 20/70=0.286 and decreases to 30% or less of the normal RF amplitude. Moreover, since intersymbol interference occurs in actual recording, it is expected that the top level further decreases. Therefore, the quadruple-speed recording according to the method cannot satisfy a specification required at the time of regeneration. In short, by the method of the comparative example, it is difficult to perform overwriting at a speed much higher than specified speed without causing excessive drop of the top level.

COMPARATIVE EXAMPLE 3

A case of performing direct overwriting such that a 2.4× disc is overwritten at the quadruple speed with irradiation of a laser beam of once, not by the method of recording a mark after the erasing process as in the Comparative Example 2 will now be examined.

In the recording method by the direct overwriting, while selectively switching a high laser power for mark formation and, a laser power for space formation, an optical disc surface is irradiated with a single laser beam. In this case, four kinds of combination patterns of mark/mark, mark/space, space/space, and space/mark exist in accordance with the state of an optical disc before writing. The left side of "/" indicates the state before overwriting, and the right side of "/" indicates the state after overwriting.

Although it seems to be no problem at a glance in the combinations of the same state (mark/mark and space/space) among the combinations, actually, the combination of space/space has a problem. As described in Comparative Example 2-2, when the laser power for space formation is high, the reflection level of the space portion noticeably decreases by irradiation with a laser beam, and the C/N characteristic of a regenerated signal deteriorates. This phenomenon similarly occurs also in the combination of mark/space.

To prevent the level of the RF signal from decreasing due to irradiation with a laser beam for space formation, it is necessary to prevent the laser power from exceeding a certain power value (corresponding to 9 mW in the example of FIG. 6). In this case, however, as described in Comparative Example 2-1, the large residual component ΔL2 remains in the combination of mark/space and a jitter characteristic of a regenerated signal deteriorates.

As a result, also in the method of Comparative Example 3, it is difficult to realize overwriting at high speed which is much higher than the specific speed without accompanying deterioration in the C/N characteristic and the jitter characteristic of the regenerated signal.

As examined in Comparative Examples 2 and 3, at the quadruple speed which is much higher than the specific speed, when the erasing power is increased to erase an originally recorded signal, the top level of the RF signal decreases, so that the difference between the top level and the bottom level of the RF signal with which overwriting is performed becomes very small. Consequently, deterioration occurs in the C/N performance at the time of regeneration. It is therefore extremely difficult to perform direct overwriting at a recording speed much higher than a specific speed while assuring the C/N performance equivalent to that in recording at normal speed (specific speed). On the other hand, when the erasing power is suppressed to avoid drop in the RF regenerated signal level, a modulation component of a signal recorded before remains and causes a jitter in a regenerated signal, so that it is unusable. In other words, it is extremely difficult to perform direct overwriting at a recording speed much higher than the specific speed while assuring an excellent jitter characteristic. Therefore, in the methods of Comparative Examples 2 and 3, it is actually impossible to realize overwriting at a high speed much higher than the specific speed.

Recording Method of Embodiment

A method of recording an optical disc according to an embodiment will now be described with reference to FIGS. 2A to 2C and FIG. 6 will be described. In the embodiment, to solve the problems in Comparative Examples 2 and, 3, the following method is employed.

First, in first step, by irradiating a region (track 33) to be rewritten in the optical disc 18 with the erasing beam 31B of first light intensity, an RF signal already recorded in the region to be rewritten is erased at a second recording speed (quadruple speed in this case) which is higher than a first recording speed (2× or 2.4× in this case). In the first step, by emitting the light beam of the first light intensity, the degree of modulation indicative of a relative difference between the top and bottom levels of a recorded signal changes from a first degree of modulation before irradiation to a second degree of modulation lower than the first degree of modulation, and the top level changes from the original first level to the second level lower than the first level.

In second step, by selectively irradiating the region to be rewritten which has been irradiated with the light beam of the first light intensity with the recording beam 31A of the second light intensity lower than the first light intensity or the recording beam 31A of the third light intensity higher than the first light intensity, a signal is recorded into the region to be rewritten at a second recording speed. In the second step, by emitting the optical beam of the second light intensity, the top level returns to the first level from the second level. By emitting the light beam of a third light intensity, the bottom level changes to the third level lower than the second level.

More detailed description will be given hereinbelow.

It is assumed that the signal waveform of the recording state before erasure has the first degree of modulation (Lt−Lb)/Lt as shown in FIG. 2A. On an optical disc in such a recording state, in the first step, the power of the erasing beam 31B is set to about 12 mW (first light intensity) and the erasing process is performed at the quadruple speed. The regenerated signal waveform indicative of the recording state of the optical disc (disc residual signal waveform) becomes as shown in FIG. 2B. In this case, as understood also from FIG. 6, the top level (maximum reflectance) drops from the original level Lt (first level) to Lt1 (second level) and, in contrast, the bottom level (minimum reflectance) rises from the original level Lb to Lb3. As a result, the residual component ΔL2 (=Lt1−Lb3) after erasing becomes almost equal to the residual component ΔL (refer to FIGS. 5 and 7B) in the case where the erasing is performed at the normal speed, and is reduced to a degree at which overwriting is not disturbed (to the degree at which a jitter in the regenerated signal becomes a permissible value or less). That is, the degree of modulation of the recording state after the erasing process becomes the second degree of modulation ΔL2/Lt1.

The second step is executed on the optical disc on which the erasing process has been finished. When it is assumed that overwriting is performed with an RF signal having a pattern similar to that in Comparative Example 1, the state after recording (state of the regenerated signal) becomes, for example, as shown in FIG. 2C. The overwriting at this time is performed as follows. In the case of forming a space as a portion of high reflectance, an erased region (spare erase region) in the optical disc 18 is irradiated with the recording beam 31A of a power at which the recording layer in the optical disc 18 is sufficiently crystallized to obtain high reflectance again, that is, a low power (second light intensity) of, for example, about 5 to 6 mW at which the recording level can be reset from Lt1 (second level) to the original level Lt (first level). On the other hand, in the case of forming a mark as a low-reflectance portion, the erased region (spare erase region) in the optical disc 18 is irradiated with the recording beam 31A of a higher power (third light intensity) of, for example, about 14 mW at which the recording layer in the optical disc 18 can be sufficiently made amorphous to change the reflectance to the lowest state (third level).

As shown in FIG. 2C, the recording level (reflectance) of the portion irradiated with the recording beam 31A of the third light intensity (for example, 14 mW) uniformly changes to the original bottom level Lb irrespective of the original state, and this portion becomes a new mark portion. On the other hand, the portion irradiated with the recording beam 31A of the second light intensity (about 5 to 6 mW) becomes a new space portion. The new space portion is a portion in which the recording level (reflectance) remarkably drops due to irradiation of the preceding erasing beam 31B. As shown in FIG. 6, by irradiation with a beam having the power of about 5 to 6 mW, the level changes from Lt1 (second level) to the original level Lt (first level). Therefore, the degree of modulation and amplitude of an RF signal after overwriting become almost the same as those in the original state.

Figure 11:
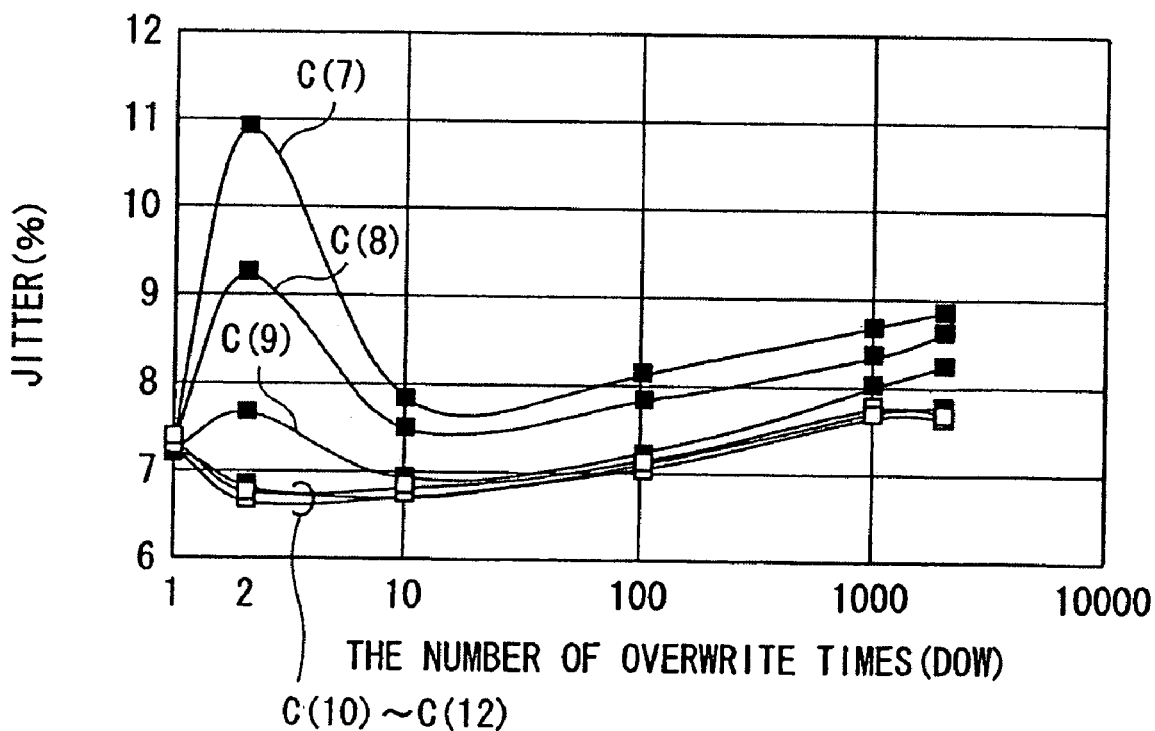
FIG. 11 is a diagram showing the number of overwrite times—jitter characteristic in the case of overwriting a 2.4× disc at the quadruple speed by an optical disc recording method of the embodiment.

FIG. 11 shows an example of the DOW characteristic obtained when overwriting is performed at the quadruple speed on a 2.4× disc by the optical disc recording method of the embodiment. The example relates to the DOW characteristic obtained when the erasing beam 31B of the first light intensity (first erasing power Pe1) is emitted in the first step and, after that, recording is performed by selectively using the recording beam 31A of the second light intensity (second erasing power Pe2=5.4 mW) and the recording beam 31A of the third light intensity (peak power Pp=14 mW) in the second step. The first erasing power Pe1 changes in steps of 1 mW from 7 mW to 12 mW. Curves C(7), C(8), C(9), C(10), C(11), and C(12) show jitter characteristics in the case where the first erasing power Pe1 is set to 7 mW, 8 mW, 9 mW, 10 mW, 11 mW, and 12 mW, respectively.

As obviously understood from FIG. 11, when the first erasing power Pe1 exceeds 10 mW, a jitter at DOW=2 hardly increases. In the range of DOW=about 1,000 times, a jitter increases a little but the increase is 9% or less. Considering that the upper limit of a jitter in practical use is 9 to 10%, the level presents no problem. As understood from FIG. 6, the top level of the RF signal starts decreasing when the first erasing power Pe1 exceeds 9 mW. In a region of 10 mW to 12 mW in which a jitter hardly increases at DOW=2, the top level decreases to about 70% to 40% of the top level before the erasing process. When the power is increased and the top level drops below 40%, the level becomes equal to the bottom level of the original RF signal. Consequently, it is difficult to increase the top level to the original top level in the following recording process (irradiation of the recording beam 31A of the second erasing power Pe2).

As understood from FIG. 11, also in the case of setting the first erasing power to about 7 mW to 9 mW, by performing the overwriting process of about 10 times on an optical disc, a jitter can be suppressed to 9% or less, so that there is no problem in practice.

It is understood from FIG. 6 that by irradiation of the recording beam 31A of the second erasing power Pe2 (=5.4 mW) in the first step, the recording level (reflectance) of an optical disc can be reset to the top level before erasure. By performing the erasing process in the first step, it becomes possible to perform recording with a relatively low peak power Pp (=14 mW). That is, recording can be performed at a low level power rather than the optimum peak power of 15 to 16 mW in double-speed recording. The reason can be considered that since a portion in which the reflectance decreases due to the erasing process with the preceding erasing beam 31B is irradiated with the recording beam 31A, the recording layer in the optical disc can efficiently absorb the energy of the recording beam 31A.

Figure 3:
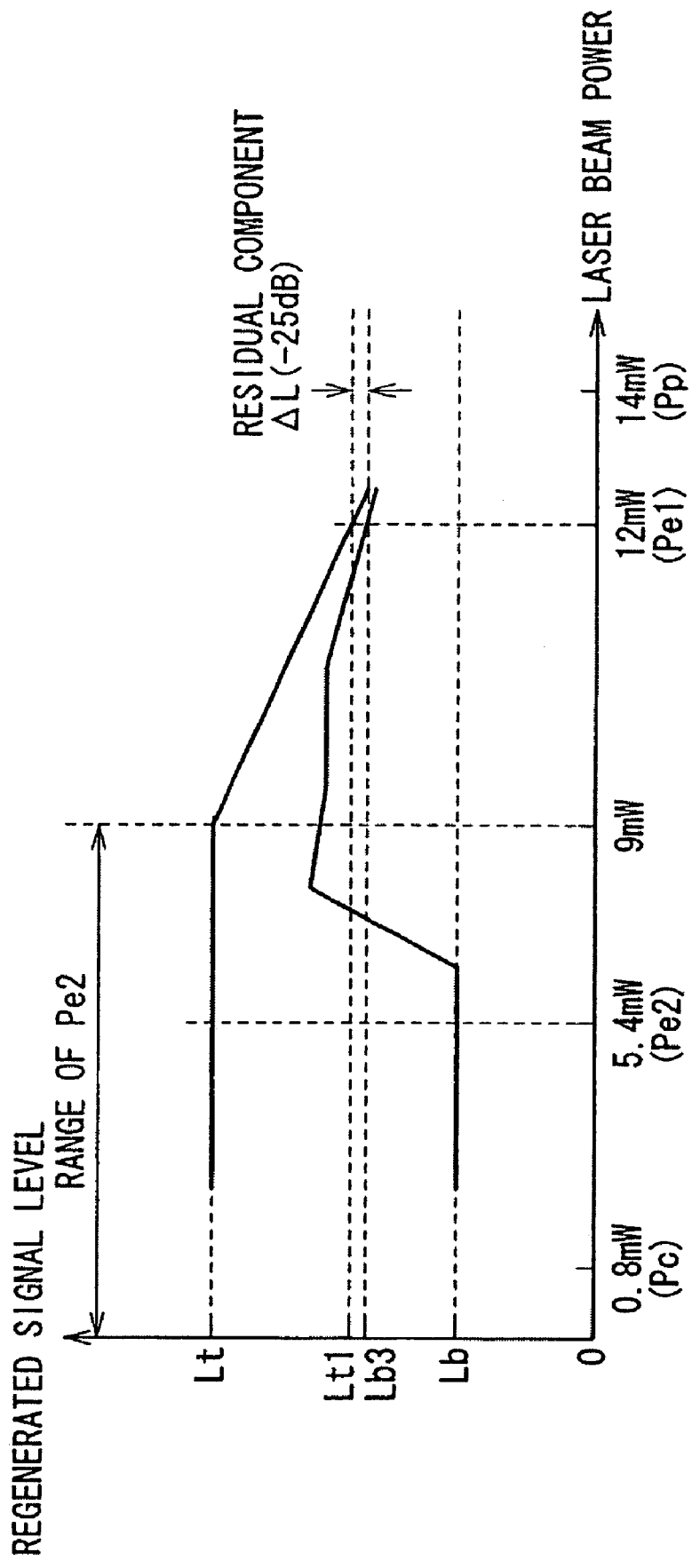
FIG. 3 is a diagram illustrating a method of setting a laser power by the optical disc recording apparatus of FIGS. 1A and 1B.

With reference to FIG. 3, a method of setting a laser power used in the optical disc recording method of the embodiment will be described. FIG. 3 is a schematic diagram of FIG. 6.

First, an RF signal having a waveform, for example, as shown in FIG. 2A is recorded onto an optical disc of which recording speed specification is 2× or 2.4× at a normal recording speed (2× or 2.4×). The recording can be performed by using, for example, a spare region on an optical disc.

Second, by irradiating the region in the optical disc on which the RF signal is recorded with the erasing beam 31B while varying the power and by regenerating a signal from the region, the characteristic curve showing the relation between the laser beam power and the regenerated signal level as shown in FIG. 3 is obtained. On the basis of the characteristic curve, the first erasing power Pe1 (first light intensity) at which the remaining (residual component ΔL) of an RF signal already recorded becomes about −25 dB and the top level Lt1 (second level) of the RF signal becomes about 40 to 70% of the original top level Lt (first level) is determined. In the example of the diagram, the first erasing power Pe1 is set to, for example, about 12 mW.

The residual component ΔL is set to about −25 dB to suppress a jitter to about 9% or less at a practical level. The top level of an RF signal is set to 40% or higher of the original top level for the reason that if the top level is set to be lower than 40%, it becomes difficult to reset the top level to the original top level in the following recording process. The top level is set to 70% or less for the reason that, at a top level higher than 70%, the heat absorption efficiency in the following recording process deteriorates and the residual component ΔL becomes larger than −25 dB.

Third, on the basis of the characteristic curve of FIG. 3, the laser power (corresponding to 9 mW in FIG. 3) at which the top level of the RF signal starts decreasing by irradiation of the erasing beam 31B is used as the upper limit and a power value lower than the laser power is selected as the second erasing power Pe2 (second light intensity). In the example of FIG. 3, the second erasing power Pe2 is set to, for example, 5.4 mW.

Fourth, in this state, a mark is recorded while varying the power of the recording beam 31A. After that, a signal is regenerated, and the peak power Pp (third light intensity) at which a jitter in the regenerated signal and the DOW characteristic become the best is determined. In the example of FIG. 3, the peak power Pp is set to, for example, 14 mW.

Fifth, by variously changing the power of the recording beam 31A in a cooling period, a cooling power Pc at which a jitter in the regenerated signal becomes the minimum is determined. The cooling period is determined to quickly cool a quickly heated recording layer in an optical disc so that the recording layer becomes amorphous.

The value of each of the laser powers is preliminarily determined by the first to fifth procedures on various phase change optical recording discs before shipment from a factory of an optical disc recording apparatus and stored in a not-shown memory in the recording controller 12 (FIG. 1). Alternately, each time a phase change optical disc is set into the optical disc recording apparatus by the user, the value of each of the laser powers may be determined by automatically performing the first to fifth procedures using a spare region in the set optical disc, and stored into the memory in the recording controller 12.

The details of the case of actually overwriting at high speed exceeding a speed specification on the basis of the laser powers determined as described above will now be described.

Figures 4A, 4B:
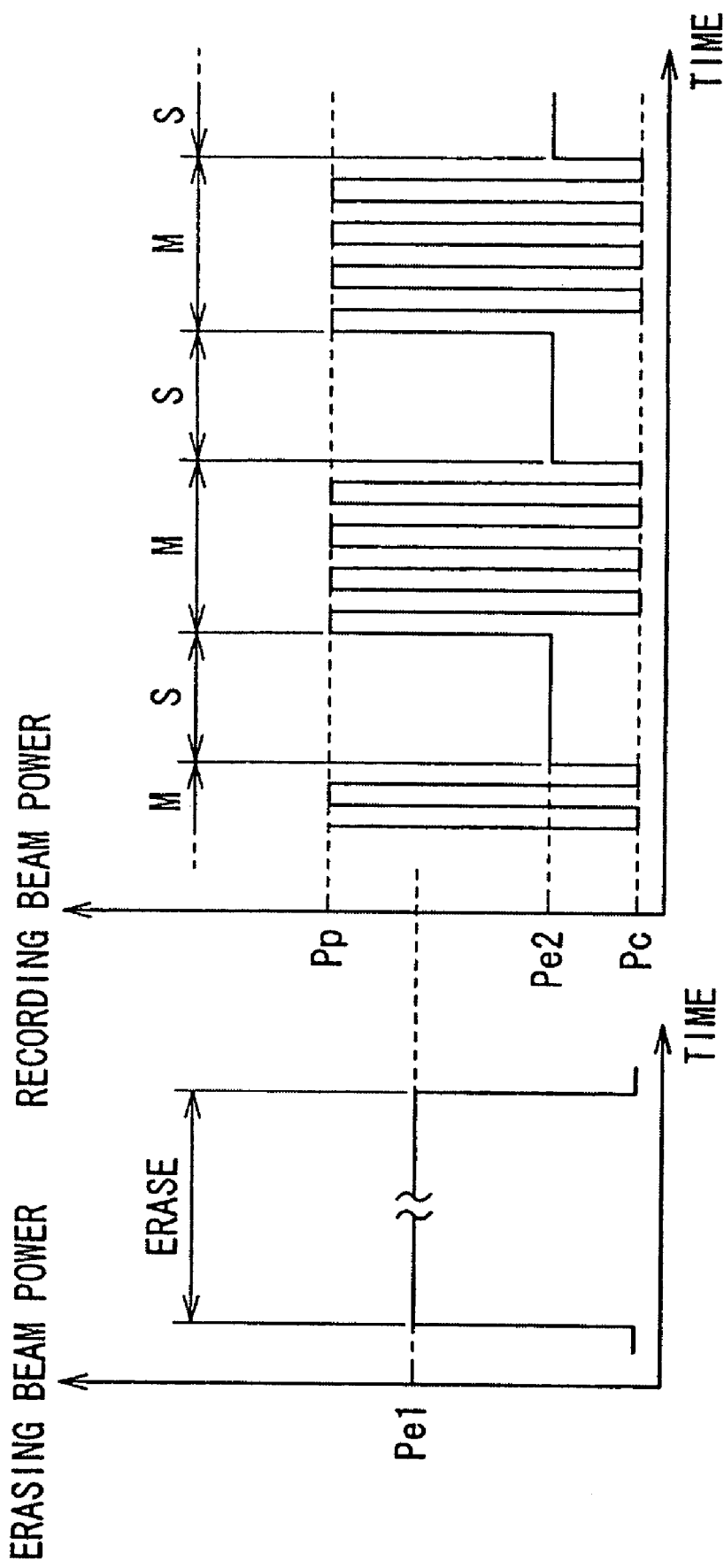
FIGS. 4A and 4B are diagrams showing a concrete example of a laser drive signal waveform in the case of performing overwriting with a laser beam of which power is set by the laser power setting method of FIG. 3.

FIGS. 4A and 4B show laser beam irradiation timings in the case of actually overwriting on the basis of a determined laser power. FIG. 4A shows the irradiation timing and the laser power of the erasing beam 31B and FIG. 4B shows the irradiation timings and laser powers of the recording beam 31A.

As shown in FIG. 4A, in the first step, a recorded optical disc is continuously irradiated with the erasing beam 31B of the first erasing power Pe1 or pulses at narrow intervals of about 1T, thereby (preliminarily) erasing a signal.

Next, as shown in FIG. 4B, in the case of forming a space, the region on which the preliminary erasing of the signal has been finished is irradiated with the recording beam 31A of the second erasing power Pe2. On the other hand, in the case of forming a mark, the region subjected to the preliminary erasing is irradiated with the recording beam 31A of the peak power Pp in pulses. The bottom value of the pulse is the cooling power Pc. In the diagram, the period of reference numeral S corresponds to a space formation period, and the period of reference numeral M corresponds to a mark formation period.

As described above, according to the embodiment, with the preceding erasing beam 31B out of two laser beams, the modulation component of an RF signal recorded on an optical disc is erased to a state where no problem occurs (the reflectance difference is reduced) and the top level is dropped to 70 to 40% of the top level of the original RF signal. After that, a space is recorded with the subsequent recording beam 31A at a laser power at which the top level is reset to the original state (before the erasure), and a mark is recorded at a laser power at which the bottom level is sufficiently dropped. Consequently, even at the quadruple speed (about 1.6 to 2 times as high as the specification) which is much higher than the specific recording speed (for example, 2× to 2.4×) of a phase change optical disc, overwrite can be performed with the recording characteristics which can satisfy regenerating characteristic specifications.

In particular, the erasing beam 31B and the recording beam 31A have roles independent of each other such as erasure of a modulation component of an original signal and assurance of a proper RF signal level, respectively, so that the power of each beam can be set to an optimum value. Consequently, even at a high speed much higher than a specification, occurrence of a jitter due to insufficient erasing can be effectively avoided, and a sufficient RF signal level can be assured.

Moreover, the portion in which the reflectance drops to about 70 to 40% of the original reflectance by the erasing process using the preceding erasing beam 31B is recorded with the recording beam 31A, so that heat absorption of the disc is improved. As a result, as compared with the power required for recording only with irradiation of a beam of once without performing the erasing operation using the preceding beam, the peak power Pp of the recording beam 31A can be lowered. It means that the invention acts particularly advantageous on a phase change recording disc having a characteristic that the limit value of the number of overwriting times (DOW times) depends on the peak power value in recording (that is, a characteristic such that when irradiation with a beam is repeated at an excessive power, the reversible phase change characteristic of the recording layer deteriorates). That is, the number of DOW times is expected to be improved and, in practice, overwriting of 1,000 times or more becomes possible.

Although the invention has been described above by the embodiments, the invention is not limited to the embodiment but can be variously modified. For example, the case of performing overwriting at the quadruple speed on a phase change optical disc provided for 2× or 2.4× has been described in the foregoing embodiments. Also in the case where the specific recording speed of an optical disc further increases and a disc for the quadruple speed becomes available, if similar conditions are satisfied, recording at 8× which is twice as high as the quadruple speed becomes possible. Similarly, recording can be performed with a specification of a higher writing speed.

In the embodiment, the case of irradiating an optical disc with two beams by using two beam lasers having two light emission points has been described. It is also possible to use a laser array having three or more light emission points on a single chip and use beams emitted from two of the light emission points as the erasing beam and the recording beam. Further, it is also possible to construct an optical system by combining a plurality of laser devices and use two of the laser devices.

Although an example of the recording method using two beams on precondition that erasing and recording operations are performed concurrently (in parallel) has been described, the invention can be also realized by using one laser. For example, in an idle state where actual recording is not performed, the beam power is set to the first erasing power Pe1 and recorded data is erased at high speed (speed much higher than a specification), thereby enabling streaming data of high transfer speed to be recorded at high speed with low power. The method is particularly effective to the case of recording data at a high speed exceeding a specification onto an optical disc used for the first time. Specifically, when an unused optical disc is set in an optical disc recording apparatus, at the first stage, by performing a process, which can be called initialization, of scanning the whole surface of the optical disc with a beam of the first erasing power Pe1 at high speed, high-speed recording can be performed only by changing the power of a beam to either the second erasing power Pe2 or the peak power Pp.

In the embodiment, the case of performing overwriting a phase change optical disc having a specification of 2× or 2.4× recording speed at the quadruple speed which is 1.6 times as high as the specific recording speed has been described. Alternately, recording can be also performed at a speed which is about 1 to 1.5 times as high as the specific recording speed. In this case, the erasing process can be sufficiently performed with a power of which top level of an RF signal after the erasing process with the erasing beam 31B is 100 to 70% of the RF top level before erasing operation (that is, the residual component of the degree of modulation is reduced to a degree at which a jitter in the regenerated signal does not cause a problem). Therefore, when the recording speed is within the range of 1 to 1.5 times as high as the specific recording speed, it is sufficient to set the first erasing power Pe1 of the erasing beam 31B to a value satisfying such a condition (specifically, the top level of an RF signal after the erasing process lies in the range from 100 to 70% of the RF top level before the erasing process).

Although the case where the optical disc recording apparatus of the embodiment has the high-speed mode of performing overwriting at the quadruple speed which is higher than the specific speed on a phase change optical disc having a specification of 2× or 2.4× has been described above, the optical disc recording apparatus can have, in addition to the high-speed mode, a normal mode of performing recording at an inherent recording speed (2× or 2.4×) (refer to FIGS. 7A to 7C of Comparative Example 1). In this case, the recording control unit 12 selects any of the modes in accordance with an instruction from the outside.

The optical disc recording method and apparatus of the embodiment can be applied not only to an optical disc of a DVD type but also to phase change discs (including CD-RW) of other kinds which can be overwritten.

As described above, in the optical disc recording method and apparatus of the invention, by irradiating the region to be rewritten in the phase change optical disc with the light beam of the first light intensity, a signal already recorded in the region to be rewritten is erased at the second recording speed higher than the first recording speed. Subsequently, by selectively irradiating the region which has been irradiated with the light beam of the first light intensity with the light beam of the second light intensity or the light beam of the third light intensity, a signal is recorded in the region to be rewritten at the second recording speed. Consequently, by properly setting the first to third light intensities, even at the quadruple speed (about 1.6 to 2 times as high as a specific speed) much higher than the specific recording speed (for example, 2× to 2.4×) of the phase change optical disc, overwriting can be performed with a recording characteristic which can satisfy a normal regenerating characteristic. In other words, overwriting can be performed without decreasing the regenerated signal level while suppressing occurrence of a jitter caused by a residual modulation component in the original recording signal.

In particular, in the optical disc recording method and apparatus, first, by irradiation with the light beam of the first light intensity, the top level is changed from the original first level to a second level lower than the original first level. After that, by irradiation with the light beam of the third light intensity, the bottom level is changed to a third level lower than the second level. Thus, the light intensity (third light intensity) for forming a mark portion may be lower than that in the case of the normal recording speed. Consequently, the number of overwrite times on a phase change optical disc can be increased as compared with the case of recording at a normal speed, and the life of the disc can be increased.

Obviously many modifications and variations of the present invention are possible in the light of the above teachings. It is therefore to be understood that within the scope of the appended claims, the invention may be practiced otherwise than as specifically described.

What is claimed is:

1. An optical disc recording method of recording signals so as to be overwritten by selectively irradiating a rewritable phase change optical disc with a first light beam and a second light beam, the rewritable phase change optical disc being formed so as to be adapted to recording at a first recording speed, comprising:

a first step of irradiating a region to be rewritten in a phase change optical disc with a first light beam of first light intensity, thereby erasing a signal already recorded in the region to be rewritten at a second recording speed higher than the first recording speed, a degree of modulation of the signal indicative of a relative difference between a top level and a bottom level of the recorded signal being changed from a first modulation degree before the irradiation to a second modulation degree lower than the first modulation degree, and the top level being changed from the original first level to a second level lower than the original first level by irradiation with the first light beam of the first light intensity, the second level being 40% to 70% of the original first level and the second modulation degree being such that a difference between the remaining top and bottom level is about −25 dB; and a second step of selectively irradiating the region to be rewritten, the region having been irradiated with the first light beam of the first light intensity, with a second light beam of second light intensity lower than the first light intensity or a second light beam of third light intensity higher than the first light intensity, thereby recording a signal in the region to be rewritten at the second recording speed, the top level being reset from the second level to the first level by irradiation with the second light beam of the second light intensity, or the bottom level being changed to a third level lower than the second level by irradiation with the second light beam of the third light intensity.

2. An optical disc recording method according to claim 1, wherein the first light intensity is set so that a jitter in a regenerated signal, the jitter arising from the second modulation degree remaining after completion of the first step, is suppressed under or equal to 9%.

3. An optical disc recording method according to claim 1, wherein the second recording speed is set to 1.6 to 2 times as high as the first recording speed.

4. An optical disc recording apparatus for recording signals so as to be overwritten by selectively irradiating a rewritable phase change optical disc formed so as to be adapted to recording at a first recording speed with light beams, comprising:

a first light source for emitting a first light beam;

a second light source for emitting a second light beam;

erasing control means for controlling the first light source so that the first light beam emitted to the region to be rewritten in a phase change optical disc comes to have first light intensity, thereby erasing a signal already recorded in the region to be rewritten at a second recording speed higher than the first recording speed, the erasing control means changing a modulation degree of the signal indicative of a relative difference between a top level and a bottom level of the recorded signal from a first modulation degree before irradiation to a second modulation degree lower than the first modulation degree and changing the top level to a second level lower than the original first level by irradiation with the first light beam of the first light intensity, the second level being 40% to 70% of the original first level and the second modulation degree being such that a difference between the remaining top and bottom level is about −25 dB; and recording control means for controlling the second light source so that the second light beam selectively emitted to the region to be rewritten, the region having been irradiated with the first light beam of the first light intensity, has either second light intensity lower than the first light intensity or third light intensity higher than the first light intensity, thereby recording a signal into the region to be rewritten at the second recording speed, the recording control means changing the top level from the second level to the first level by irradiation with the second light beam of the second light intensity, or changing the bottom level to a third level lower than the second level by irradiation with the second light beam of the third light intensity.

5. An optical disc recording apparatus according to claim 4, wherein the erasing control means sets the first light intensity so that a jitter in a regenerated signal, the jitter arising from the second modulation degree remaining after completion of the first step, is suppressed under or equal to 9%.

6. An optical disc recording apparatus according to claim 4, wherein the second recording speed is 1.6 to 2 times as high as the first recording speed.

7. An optical disc recording apparatus for recording signals so as to be overwritten by selectively irradiating a rewritable phase change optical disc formed so as to be adapted to recording at a first recording speed with light beams, comprising:

a first light source configured to emit a first light beam;

a second light source configured to emit a second light beam;

an erasing control unit configured to control the first light source so that the first light beam emitted to the region to be rewritten in a phase change optical disc comes to have first light intensity, thereby erasing a signal already recorded in the region to be rewritten at a second recording speed higher than the first recording speed, the erasing control unit configured to change a modulation degree of the signal indicative of a relative difference between a top level and a bottom level of the recorded signal from a first modulation degree before irradiation to a second modulation degree lower than the first modulation degree and to change the top level to a second level lower than the original first level by irradiation with the first light beam of the first light intensity, the second level being 40% to 70% of the original first level and the second modulation degree being such that a difference between the remaining top and bottom level is about −25 dB; and a recording control unit configured to control the second light source so that the second light beam selectively emitted to the region to be rewritten, the region having been irradiated with the first light beam of the first light intensity, has either second light intensity lower than the first light intensity or third light intensity higher than the first light intensity, thereby recording a signal into the region to be rewritten at the second recording speed, the recording control unit configured to change the top level from the second level to the first level by irradiation with the second light beam of the second light intensity, or to change the bottom level to a third level lower than the second level by irradiation with the second light beam of the third light intensity.

8. An optical disc recording apparatus according to claim 7, wherein the erasing control unit is configured to set the first light intensity so that a jitter in a regenerated signal, the jitter arising from the second modulation degree remaining after completion of the first step, is suppressed under or equal to 9%.

9. An optical disc recording apparatus according to claim 7, wherein the second recording speed is 1.6 to 2 times as high as the first recording speed.

* * * * *